UNITED STATES PATENT OFFICE.

JOHN J. BAULCH, FREDERICK C. STEELE, WILLIAM J. LEES, AND JAMES F. EVANS, OF ST. LOUIS, MISSOURI.

LEATHER-BLACKING.

SPECIFICATION forming part of Letters Patent No. 432,853, dated July 22, 1890.

Application filed March 8, 1890. Serial No. 343,148. (Specimens.)

*To all whom it may concern:*

Be it known that we, JOHN J. BAULCH, FREDERICK C. STEELE, WILLIAM J. LEES, and JAMES F. EVANS, all of the city of St. Louis, in the State of Missouri, have invented a certain new and useful Improvement in Harness and Leather Preservative Blacking and Polish, of which the following is a full, clear, and exact description.

This invention relates to a water-proof compound that is especially adapted for the treatment of harness and of all other products of leather-manufacture, which compound, from its oleagenous and other penetrating elements, is very diffusive, carrying both itself and the elements with which it combines into the pores of the leather, from which, in consequence of its own capacity and that of other elements of the device with which it combines it is not readily ejected by moisture or other foreign elements that are obnoxious to the leather, and which fortifies the same from evaporation, and consequent hardening and lack of pliability; and the invention consists of features of novelty hereinafter fully described, and pointed out in the claims.

The preparation is compounded substantially in accordance with and of the constituent parts of the following formula, which formula is introduced by a table of the respective parts with the amounts given of the elements that enter into the combination, as follows: Beeswax, two ounces; neat's-foot oil, four ounces; drop-black, one and one-half ounce; heel-ball, two ounces; molasses, one ounce. These ingredients are mixed and thoroughly amalgamated in the following manner: The neat's-foot oil and drop-black are mixed by trituration and ground in any suitable vessel and by any suitable means until being themselves, as an initial step, thoroughly amalgamated, and the drop-black effectually ground and disintegrated. Then stir in the molasses. In the meantime the heel-ball and beeswax are to be heated together in any suitable vessel until they reach the boiling-point. Then stir the previously triturated and amalgamated neat's-foot oil, drop-black, and molasses into the above-stated boiled heel-ball and beeswax, and thoroughly mix the whole of the ingredients together, which are then to be boiled, so as to still more effectually amalgamate them and bring them into complete affinity with each other. Then allow the compound to cool, and again, lastly, mix by trituration, so as to overcome the tendency of the heavier elements to gravitate while the compound has been in a melted condition.

The prepared compound may be applied to the harness or other leather product by a brush or cloth, or by any other suitable means.

The dressing thus prepared is very economic in its production, as no expensive elements enter into its composition. It produces a surface highly impervious to water, while it is itself very penetrating and diffusive, and hence renders the leather very soft and pliable. It is very cleanly, as sufficient of its waxy ingredients remain on the surface of the leather to constitute a hard, glossy, and smooth finish, which does not transfer the coloring ingredients to objects that come in contact with it, and which being elastic and pliable does not crack under the influences of frost and heat.

We claim as our invention—

1. A water-proof compound dressing for leather, composed of the combination of beeswax, neat's-foot oil, drop-black, heel-ball, and molasses, substantially in accordance with the formula as described.

2. A water-proof compound dressing for leather, composed of the combination of the following ingredients in about the following proportions: two ounces of beeswax, four ounces of neat's-foot oil, one and a half ounce of drop-black, two ounces of heel-ball, and one ounce of molasses, substantially in accordance with the formula described.

JOHN J. BAULCH.
FREDERICK C. STEELE.
WILLIAM J. LEES.
JAMES F. EVANS.

In presence of—
BENJN. A. KNIGHT,
SAML. KNIGHT.